United States Patent
Neta et al.

(10) Patent No.: US 7,146,080 B2
(45) Date of Patent: Dec. 5, 2006

(54) METHOD OF CONNECTING AN OPTICAL ELEMENT TO A PLC

(75) Inventors: Avi Neta, Gilon (IL); Moti Margalit, Zichron Yaakov (IL); Gideon Rogovsky, Tel Aviv (IL); Eitan Avni, Karmiel (IL)

(73) Assignee: Lambda Crossing, Ltd., Tel Aviv (IL)

( * ) Notice: Subject to any disclaimer, the term of this patent is extended or adjusted under 35 U.S.C. 154(b) by 4 days.

(21) Appl. No.: 11/063,531

(22) Filed: Feb. 24, 2005

(65) Prior Publication Data

US 2005/0201667 A1   Sep. 15, 2005

Related U.S. Application Data

(60) Provisional application No. 60/628,139, filed on Nov. 17, 2004, provisional application No. 60/551,790, filed on Mar. 11, 2004, provisional application No. 60/551,794, filed on Mar. 11, 2004.

(51) Int. Cl.
  G02B 6/42  (2006.01)
  G02B 6/26  (2006.01)
  G02B 6/10  (2006.01)
  G02B 6/12  (2006.01)

(52) U.S. Cl. ............ 385/40; 385/14; 385/30; 385/50; 385/132

(58) Field of Classification Search ........ 385/40, 385/30, 50, 132
See application file for complete search history.

(56) References Cited

U.S. PATENT DOCUMENTS

| | | | |
|---|---|---|---|
| 4,732,446 A | * | 3/1988 | Gipson et al. ............ 385/24 |
| 4,897,711 A | | 1/1990 | Blonder et al. |
| 4,966,433 A | | 10/1990 | Blonder |
| 5,279,711 A | | 1/1994 | Frankeny et al. |
| 5,534,442 A | | 7/1996 | Parker et al. |
| 5,883,988 A | | 3/1999 | Yamamoto et al. |
| 6,121,552 A | | 9/2000 | Brosnihan et al. |
| 6,151,173 A | | 11/2000 | Massit et al. |
| 6,438,297 B1 | | 8/2002 | McKenzie |
| 6,443,631 B1 | | 9/2002 | Case et al. |

(Continued)

OTHER PUBLICATIONS

Hauffe et al: Methods for Passive Fiber Chip Couplng of Integrated Optical Devices; IEEE Transaction on Advanced Packaging, vol. 24, No. 4, Nov. 2001 pp. 450-455.

(Continued)

Primary Examiner—John D. Lee
Assistant Examiner—Rhonda S. Peace
(74) Attorney, Agent, or Firm—Simon Kahn

(57) ABSTRACT

A planar lightwave circuit and a method of producing such a planar lightwave circuit, the planar lightwave circuit having an element secured thereon. The planar lightwave circuit comprises: a substrate; a trench cut in the substrate; at least one solder pad deposited on a top surface deposited above the substrate; at least one of a waveguide defined in a layer deposited above the substrate and an optical fiber; and an optical element placed within the trench and in optical communication with the at least one of a waveguide and an optical fiber; at least one metal contact configured on the optical element to be adjacent to the metal pad, the solder pad being connected to the metal contact providing physical support to the optical element and an electrical connection between the metal pad and the metal contact.

34 Claims, 5 Drawing Sheets

U.S. PATENT DOCUMENTS

| | | |
|---|---|---|
| 6,530,698 B1 | 3/2003 | Kuhara et al. |
| 6,546,173 B1 | 4/2003 | Case et al. |
| 6,634,802 B1 | 10/2003 | Brezina et al. |
| 6,766,082 B1 * | 7/2004 | Hirabayashi et al. .......... 385/40 |
| 6,948,860 B1 * | 9/2005 | Edwards et al. ............... 385/88 |
| 7,016,561 B1 * | 3/2006 | Nishida et al. ................ 385/16 |
| 2002/0067906 A1 * | 6/2002 | Katayama et al. ........... 385/140 |
| 2002/0076161 A1 * | 6/2002 | Hirabayashi et al. .......... 385/40 |
| 2005/0063634 A1 * | 3/2005 | Cohen et al. .................. 385/14 |

OTHER PUBLICATIONS

Moosburger et al; Pasive Alignment of Single-Mode Fibers to Integrated Polymer Waveguide Structures Utilizing a Single-Mask Process.
IEEE Photonics Technology Letters; vol. 11, No. 7 July 1999 pp. 848-850.
Takahashi et al; A Polymer PLC Platform with a Fiber-Alignment V-Groove to a Low-Cost 10-GbE WWDM Transmitter.
IEEE Photonics Letters; vol. 16, No. 1, Jan. 2004 pp. 266-268.

* cited by examiner

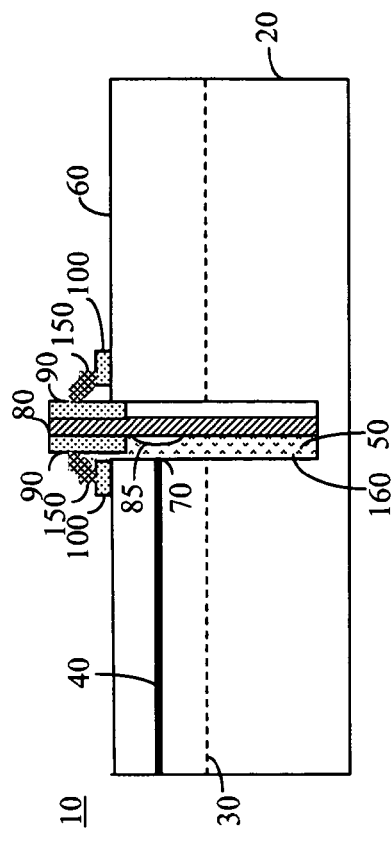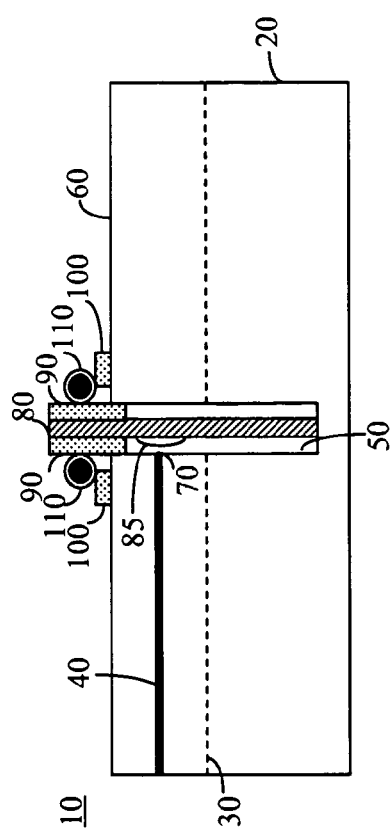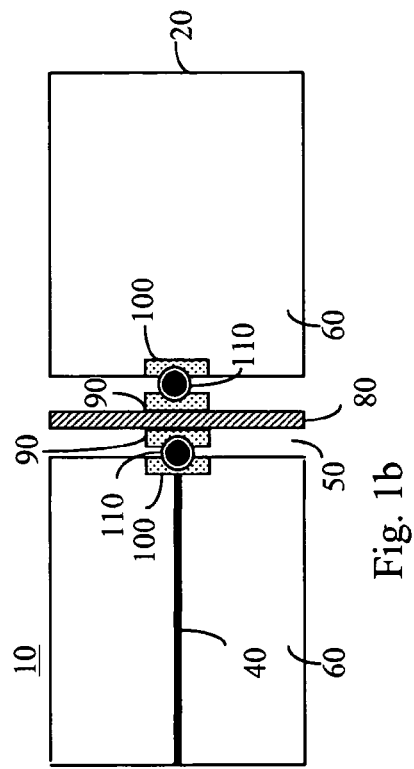

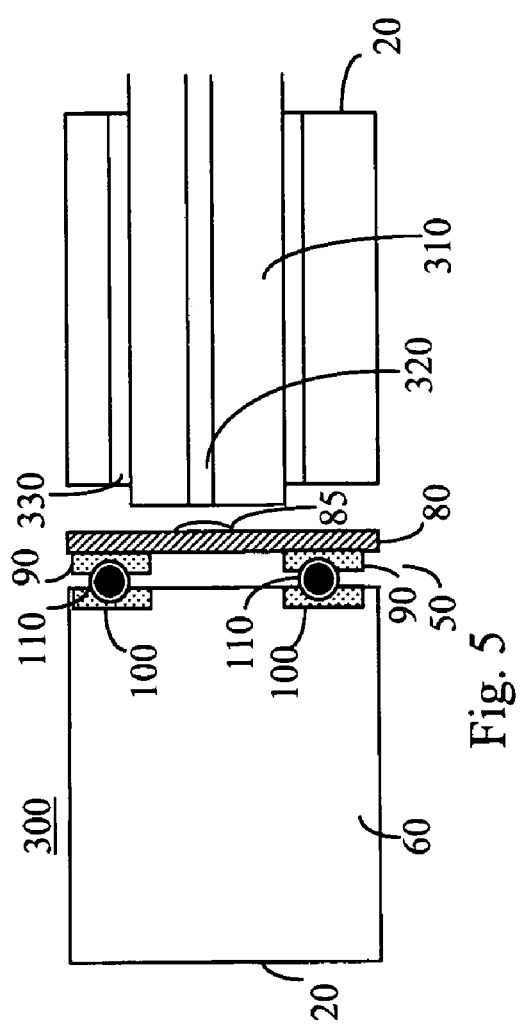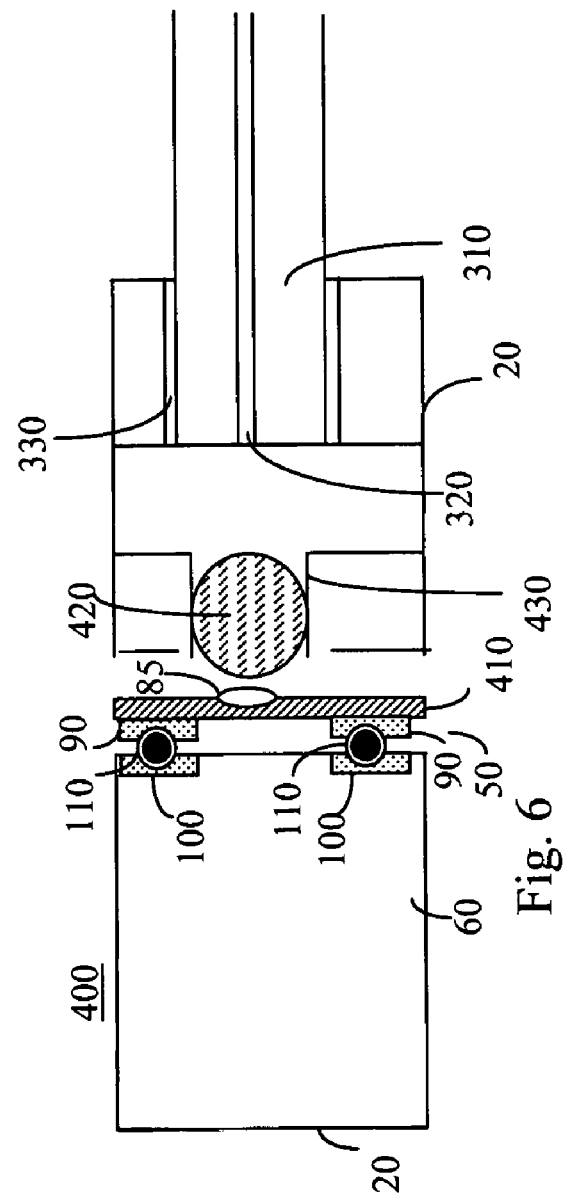

METHOD OF CONNECTING AN OPTICAL ELEMENT TO A PLC

CROSS-REFERENCE TO RELATED APPLICATIONS

This application claims priority from U.S. Provisional Patent Application Ser. No. 60/551,790 filed Mar. 11, 2004 entitled "METHOD OF COUPLING FIBER TO WAVEGUIDE"; U.S. Provisional Patent Application Ser. No. 60/551,794 filed Mar. 11, 2004 entitled "METHOD OF CONNECTING AN OPTICAL ELEMENT TO A PLC"; and U.S. Provisional Patent Application Ser. No. 60/628,139 filed Nov. 17, 2004 entitled "METHOD OF CONNECTING AN OPTICAL ELEMENT TO A PLC". The entire contents of each of the above mentioned applications are incorporated herein by reference.

BACKGROUND OF THE INVENTION

The invention relates generally to the field of planar lightwave circuits and in particular to a method of attaching an optical element to a planar lightwave circuit.

Optical fiber is commonly used in telecommunication equipment to carry an optical signal. Optical sub-components, devices and modules, hereinafter generally referred to as optical components typically comprise at least one element which operates on the optical signal. Such an operation may comprise conversion between an electrical signal and an optical signal. Advantageously, optical components are produced in the form of a planar lightwave circuit (PLC), thus allowing for consistent mass production and effective cost reduction. Certain elements, such as photodiodes, vertical cavity surface emitting lasers (VCSELs) and vertical external cavity surface emitting lasers (VECSELs) are typically produced independently of the PLC, and must then be installed and connected to the PLC.

A major difficulty in the production of the PLC is the need to attach and align the independently produced elements to the PLC. Attachment to the PLC requires an electrical connection, a means of physically securing the element to the PLC and a means of ensuring optical alignment between the element and either a fiber secured to, or a waveguide defined on, the PLC.

There is a long felt need for an improved means of attaching an element to a PLC, preferably avoiding the need for wire bonding.

SUMMARY OF THE INVENTION

Accordingly, it is a principal object of the present invention to overcome the disadvantages of prior art methods of attaching an element to a PLC. This is provided in the present invention by forming a trench in the PLC, and placing the element in the trench with its active optical input or output facing a fiber or waveguide facet. Metal pads are deposited on a top cladding layer of the PLC, and are provided on the element in the area that is destined to be near the top cladding layer. In one embodiment solder balls are used to make operative connections and to secure the element in place on the PLC. In another embodiment conducting adhesive such as silver epoxy is used to make operative connections and to secure the element in place on the PLC.

The invention provides for a planar lightwave circuit having an element secured thereon, the planar lightwave circuit comprising: a substrate; a trench cut in the substrate; at least one metal pad deposited on a top surface above the substrate; at least one of a waveguide defined in a layer deposited above the substrate and below the at least one metal pad and an optical fiber; and an optical element placed within the trench and in optical communication with the at least one of a waveguide and an optical fiber, the optical element comprising at least one metal contact configured to be adjacent to the metal pad, the metal contact being connected to the metal pad by at least one of a solder ball and a conductive adhesive, wherein the at least one of a solder ball and a conductive adhesive supplies physical support to the optical element and electrical connection between the metal pad and the metal contact.

In one embodiment the optical element comprises an active optical area on a facet of the optical element substantially perpendicular to the top surface, the optical communication being between the active optical area and the at least one of a waveguide and an optical fiber. In another embodiment the optical element is a photodiode. In yet another embodiment the optical element is one of a vertical cavity surface emitting laser and a vertical external cavity surface emitting laser. Preferably the planar lightwave circuit further comprises a lens, the lens being placed between the optical element and the at least one of a waveguide and an optical fiber. Further preferably the lens is a ball lens.

In one embodiment the planar lightwave circuit further comprises a lens, the lens being placed between the optical element and the at least one of a waveguide and an optical fiber. Preferably the lens is a ball lens.

In one embodiment the metal pad is connected to the metal contact over a gap. In another embodiment the conductive adhesive is silver epoxy. In another embodiment the at least one metal pad comprises two metal pads, and the at least one metal contact comprises two metal contacts configured on the optical element to be adjacent the two metal pads, each of the two metal pads being connected to a respective one of the two metal contacts.

In one embodiment the metal pad is separated from the metal contact by a gap. Preferably the gap is filled with optical adhesive, the optical adhesive supporting the at least one of a solder ball and a conductive adhesive.

The invention independently provides for an optical element for use in a planar lightwave circuit having a substrate, the optical element comprising: a first facet having an optical aperture, the first facet exhibiting an end configured and dimensioned to placed at the bottom of a trench formed in a planar lightwave circuit; and a plurality of contacts removed from the end and positioned to be adjacent to matching pads deposited on a top surface of the planar lightwave circuit.

In one embodiment at least one of the plurality of contacts is placed on the first facet. In another embodiment the contacts are dimensioned to extend below the top surface. In yet another embodiment the optical element further comprises a facet opposing the first facet, wherein at least one of the plurality of contacts is placed on the facet opposing the first facet. In yet another embodiment the optical element is one of a photodiode, a vertical cavity surface emitting laser and a vertical external cavity surface emitting laser.

The invention independently provides for a method of manufacturing a planar lightwave circuit, comprising: defining a waveguide; defining a top surface above the waveguide; depositing at least one metal pad on the top surface; providing an optical element having at least one metal contact configured to be adjacent the deposited metal pad; cutting a trench; defining a facet of the waveguide;

inserting the provided optical element within the cut trench; and connecting the at least one metal contact to the at least one deposited metal pad.

In one embodiment the provided optical element comprises an active optical area, the stage of inserting being accomplished with the active optical area being substantially perpendicular to the waveguide. In another embodiment the provided optical element is one of a photodiode, a vertical cavity surface emitting laser and a vertical external cavity surface emitting laser.

In one embodiment the connecting comprises placing a solder ball and heating the placed solder ball. In another embodiment the connecting comprises placing conductive adhesive. In yet another embodiment the connecting further comprises filling a gap between the metal contacts and the metal pads with optical adhesive. Preferably the connecting comprises placing conductive adhesive on top of the optical adhesive, the optical adhesive supporting the conductive adhesive. Preferably the connecting provides physical support to the optical element and electrical connection between the metal pad and the metal contact.

The invention independently provides for a method of manufacturing a planar lightwave circuit, comprising: providing a substrate; defining a v-groove in a first portion of the substrate; defining a top surface deposited on a second portion of the substrate; depositing at least one metal pad on the top surface; providing an optical element having at least one metal contact configured to be adjacent the deposited metal pad; cutting a trench; placing an optical fiber in the v-groove; inserting the provided optical element within the cut trench; and connecting the at least one metal contact to the at least one deposited metal pad.

In one embodiment the provided optical element comprises an active optical area, the inserting being accomplished with the active optical area being substantially perpendicular to placed optical fiber. In another embodiment the provided optical element is one of a photodiode, a vertical cavity surface emitting laser and a vertical external cavity surface emitting laser. In yet another embodiment the connecting comprises placing a solder ball and heating the placed solder ball. In yet another embodiment the connecting comprises placing conductive adhesive.

In one embodiment the connecting further comprises filling a gap between the metal contacts and the metal pads with optical adhesive. Preferably the connecting comprises placing conductive adhesive on top of the optical adhesive, the optical adhesive supporting the conductive adhesive.

In one embodiment the connecting provides physical support to the optical element and electrical connection between the metal pad and the metal contact.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 1a and 1b illustrate a side view and a top view, respectively, of a PLC based optical component comprising an optical element attached according to the principle of the invention utilizing solder balls;

FIG. 1c illustrates a side view of a PLC based optical component comprising an optical element attached according to the principle of the invention utilizing conductive adhesive;

FIG. 5 illustrates a top view of a PLC based optical component comprising an optical fiber secured in a v-groove, and having an element placed within a trench according to the principle of the current invention; and FIG. 6 illustrates a top view of a PLC based optical component comprising an optical fiber and a focusing ball lens secured in a silicon optical bench, and having an optical element placed within a trench and attached according to the principle of the invention.

DETAILED DESCRIPTION OF THE PREFERRED EMBODIMENTS

Figure 2:
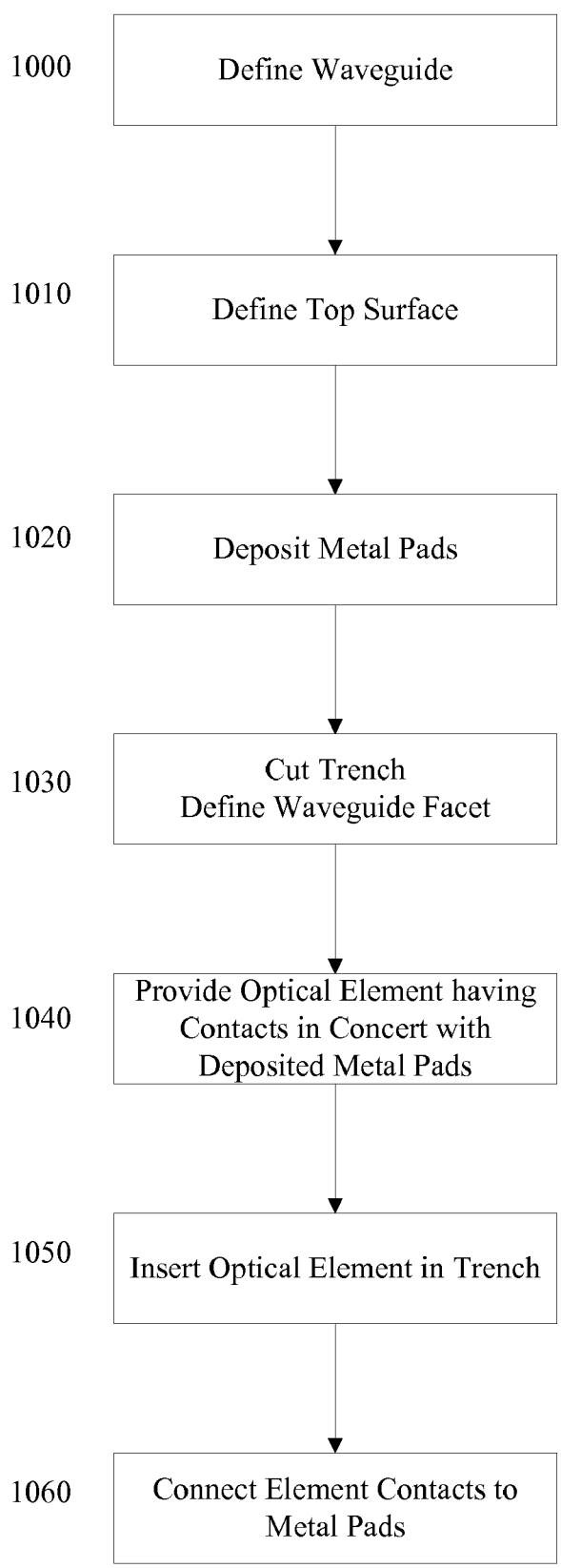
FIG. 2 illustrates stages in the production of the PLC based optical component of FIGS. 1a–1c.

The present embodiments enable an improved means of attaching an element to a PLC based structure. This is accomplished by arranging metal pads on the top surface of the PLC; forming a trench in the PLC; placing the element in the PLC, the element having contacts on a side destined to be adjacent to the metal pads on the top surface of the PLC; and securing the element to the top surface with solder balls or conductive adhesive, such as silver epoxy.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1a illustrates a side view of a PLC based optical component 10 comprising an optical element attached according to the principle of the invention. PLC based optical component 10 comprises: substrate 20; substrate top 30; waveguide 40; trench 50; top surface 60; waveguide facet 70; metal pads 100; optical element 80 exhibiting active surface 85 and metal contacts 90; and solder balls 110. Waveguide 40 is formed in a layer deposited above substrate top 30. Trench 50 is cut into PLC based optical component 10, preferably below substrate top 30 into substrate 20. Trench 50 defines a location for optical element 80 and further defines facet 70 of waveguide 40. Metal pads 100 are deposited onto top surface 60. Optical element 80 is formed with metal contacts 90 configured to appear on either side of optical element 80, and to at least be level with and preferably extend below metal pads 100 when optical element 80 is inserted vertically within trench 50. Solder balls 110 create a contact between metal contacts 90 and metal pads 100.

Active surface 85, is herein interchangeably called an active optical surface and an optical aperture and is meant to include that portion of optical element 80 designed to transmit or receive light.

A unique feature of the invention is that optical element 80 is configured to have metal contacts appearing at a location to be in concert with metal pads 100 deposited on top surface 60. Optical element 80 is placed vertically within trench 50, with active area 85 positioned opposite facet 70 of waveguide 40. In particular, active area 85 typically comprising an optical aperture appears on a facet which is perpendicular to the plane of top surface 60, and is in direct optical communication with facet 70. It is to be noted that in prior art devices, a mirror or other light bending device is required. Advantageously, no mirror or light bending apparatus is required according to the current invention, and light proceeds in a straight line from facet 70 to active area 85 of optical element 80. In an exemplary embodiment, optical element 80 comprises a photodiode.

FIG. 1*b* illustrates a top view of PLC based optical component 10 shown in FIG. 1*a*, in which like numerals designate corresponding elements. Layers above waveguide 40 are illustrated transparently in order to show the location of waveguide 40. Optical element 80 is shown secured vertically within trench 50. Solder balls 110 are shown forming contacts between metal contacts 90 and metal pads 100. Solder balls 110 further form a mechanical connection between metal contacts 90 and metal pads 100 thereby physically securing optical element 80 within PLC based optical component 10.

Metal contacts 90 and metal pads 100 are shown herein in a plane with waveguide 40 and on opposing sides of optical element 80 however this is not meant to be limiting in any way. The combination of metal contacts 90 and metal pads 100 may be located to one or both sides of waveguide 40, on a single side of optical element 80, or in any combination of possibilities without exceeding the scope of the invention.

Solder balls 110 are illustrated for convenience and ease of illustration. Optionally, as further described in relation to FIG. 1*c*, a conductive adhesive such as silver epoxy may be used in place of solder balls 110 without exceeding the scope of the invention. In the event that a gap exists between the metal pads and metal contacts, in an exemplary embodiment the gap is preferably filled with optical adhesive thus supplying a base to support the conductive adhesive across the gap.

FIG. 1*c* illustrates a side view of a PLC based optical component 10 comprising an optical element attached according to an embodiment of the principle of the invention utilizing conductive adhesive. PLC based optical component 10 comprises: substrate 20; substrate top 30; waveguide 40; trench 50; top surface 60; waveguide facet 70; metal pads 100; optical element 80 exhibiting active surface 85 and metal contacts 90; conductive adhesive 150 and optical adhesive 160. Waveguide 40 is formed in a layer deposited above substrate top 30. Trench 50 is cut into PLC based optical component 10, preferably below substrate top 30 into substrate 20. Trench 50 defines a location for optical element 80 and further defines facet 70 of waveguide 40. Metal pads 100 are deposited onto top surface 60. Optical element 80 is formed with metal contacts 90 preferably configured to appear on either side of optical element 80 as will be explained further hereinto below, and to at least be level with and preferably extend below metal pads 100 when optical element 80 is inserted vertically within trench 50. Conductive adhesive 150 creates a contact between metal contacts 90 and metal pads 100.

A unique feature of the invention is that optical element 80 is configured to have metal contacts appearing at a location to be in concert with metal pads 100 deposited on top surface 60. Optical element 80 is placed vertically within trench 50, with active area 85 positioned opposite facet 70 of waveguide 40. In particular, the optical aperture of active area 85 appears on a facet which is perpendicular to a plane defined by top surface 60, and is in direct optical communication with facet 70. It is to be noted that in prior art devices, a mirror or other light bending device is required. Advantageously, no mirror or light bending apparatus is required according to the current invention, and light proceeds in a straight line from facet 70 to active area 85 of optical element 80. In an exemplary embodiment, optical element 80 comprises a photodiode. In an exemplary embodiment conductive adhesive 150 comprises silver epoxy. In the event that a gap exists between the metal pads and metal contacts, in an exemplary embodiment the gap is filled with optical adhesive thus supplying a base to support conductive adhesive 150 across the gap. Trench 50 is depicted with optical adhesive 160 filing the gap between optical element 80 and waveguide facet 70 however this is not meant to be limiting in any way.

The preparation and production of PLC based optical component 10 of FIGS. 1*a*–1*c* is depicted in the flow chart of FIG. 2. In stage 1000, waveguide 40 is defined in layers above substrate top 30. In stage 1010, additional layers are deposited above waveguide 40, burying waveguide 40, and defining top surface 60. In stage 1020, metal pads 100 are deposited on top surface 60 defined in stage 1010.

In stage 1030 trench 50 is cut into PLC based optical component 10. Preferably, trench 50 is cut to a depth below the level of substrate top 30. Facet 70 of waveguide 40 is defined. This may be accomplished as part of cutting trench 50, or as a separate stage accomplished before are after the cutting of trench 50. In one embodiment facet 70 is defined by the cutting of trench 50, however additional polishing is required. Trench 50 may be cut by sawing, dicing or by other means known to those skilled in the art.

In stage 1040, optical element 80 is provided, optical element 80 being configured with metal contacts 90 in a position such that after insertion into trench 50 cut in stage 1030, metal contacts 90 will be in concert with metal pads 100 deposited in stage 1020. In a preferred embodiment, metal contacts 90 extend from at least the height of metal pads 100 deposited in stage 1020 and proceed downwards below the height of metal pads 100. The term downwards defines a direction towards the bottom of trench 50 cut in stage 1030. Still further preferably metal contacts 90 further extend above the height of metal pads 100 deposited in stage 1020.

In stage 1050, optical element 80 provided in stage 1040 is placed in trench 50 cut in stage 1030. In an exemplary embodiment, optical aperture 85 of optical element 80 is aligned directly opposite waveguide facet 70 defined in stage 1030. In stage 1060, metal contacts 90 of optical element 80 placed in stage 1050 are connected to metal pads 100 deposited in stage 1020. In a preferred embodiment, the stage of connecting is accomplished by depositing solder balls 110 at the nexus, or near nexus, of metal pads 100 and metal contacts 90, and heating solder balls 110. The molten solder wets metal contacts 90 of optical element 80 and metal pads 100 deposited in stage 1020 and flows to provide both good solder contact physical support.

In another embodiment, the stage of connecting is accomplished by using conductive adhesive 150 such as silver epoxy at the nexus, or near nexus, of metal pads 100 and metal contacts 90. Conductive adhesive 150 provides both good electrical contact and physical support. In the event that a large gap exists between metal pads 100 and metal contacts 90, in an exemplary embodiment the large gap is filled with optical adhesive thus supporting the conductive adhesive.

Figure 3C:
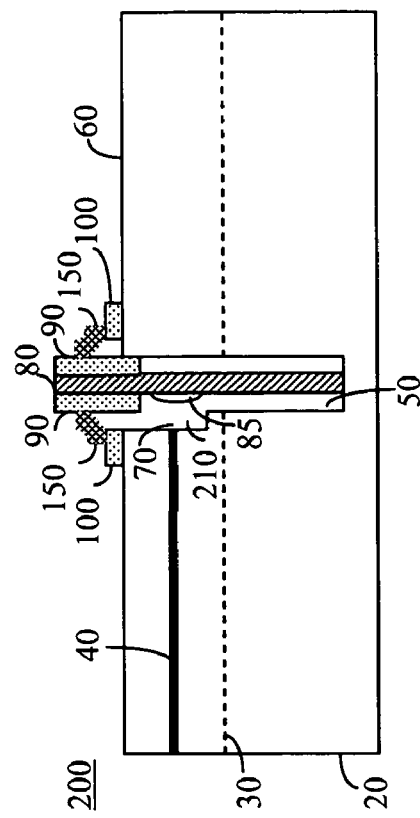
FIGS. 3c illustrates a side view of a PLC based optical component comprising a trench exposing a waveguide facet and an optical element attached according to the principle of the invention utilizing conductive adhesive.
Figure 3A:
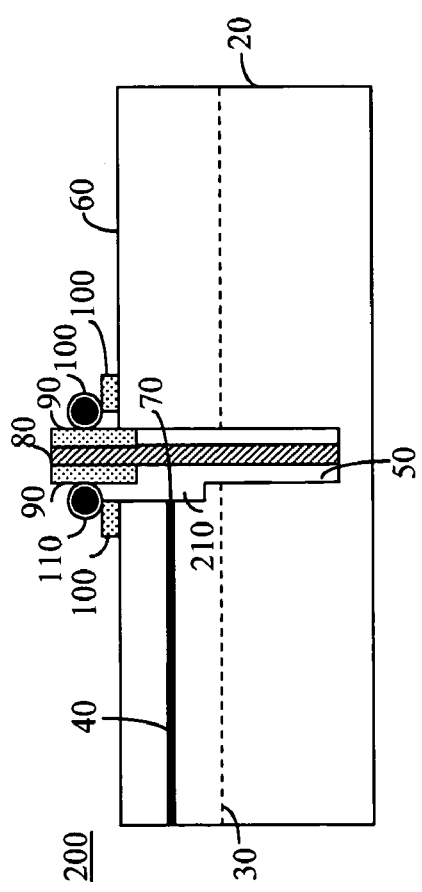
FIGS. 3a and 3b illustrate a side view and a top view, respectively, of a PLC based optical component comprising a trench exposing a waveguide facet and an optical element attached according to the principle of the invention utilizing solder balls.

FIG. 3a illustrates a side view of a PLC based optical component 200 comprising a trench 210 exposing a waveguide facet 70 and an optical element 80 attached according to the principle of the invention utilizing solder balls. PLC based optical component 200 comprises: substrate 20; substrate top 30; waveguide 40; trench 50; top surface 60; waveguide facet 70; notch 210; metal pads 100; optical element 80 exhibiting active area 85 and metal contacts 90; and solder balls 110. Waveguide 40 is formed in a layer deposited above substrate top 30. Notch 210 is etched to define facet 70 displaced from trench 50. Trench 50 is cut below the level of waveguide 40, preferably below substrate top 30 into substrate 20 to define a location for optical element 80. Metal pads 100 are deposited onto top surface 60. Optical element 80 is formed with metal contacts 90 preferably configured to appear on either side of optical element 80 as will be explained further hereinto below, and to at least be level with and preferably extend below metal pads 100 when optical element 80 is inserted vertically within trench 50. Solder balls 110 create a contact between metal contacts 90 and metal pads 100.

A unique feature of the invention is that optical element 80 is configured to have metal contacts appearing at a location to be in concert with metal pads 100 deposited on top surface 60 when optical element 80 is inserted into trench 50. Optical element 80 is placed vertically within trench 50, with active area 85 positioned opposite facet 70 of waveguide 40. In particular, active area 85 of optical element 80 appears on a facet which is perpendicular to a plane of substrate top 30, and is in direct optical communication with facet 70. It is to be noted that in prior art devices, a mirror or other light bending device is required. Advantageously, no mirror or light bending apparatus is required according to the current invention, and light proceeds in a straight line from facet 70 to active area 85 of optical element 80. In an exemplary embodiment, optical element 80 comprises a photodiode.

Figure 3B:
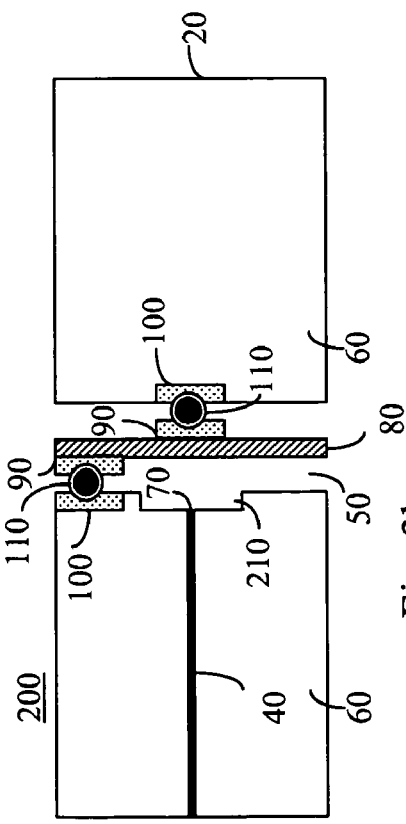

FIG. 3b illustrates a top view of PLC based optical component 200 shown in FIG. 3a, in which like numerals designate corresponding elements. Layers above waveguide 40 are shown transparently in order to show the location of waveguide 40. Optical element 80 is shown secured vertically within trench 50. Solder balls 110 are shown forming contacts between metal contacts 90 and metal pads 100. Solder balls 110 further form a mechanical connection between metal contacts 90 and metal pads 100 thereby physically securing optical element 80 within PLC based optical component 200.

One of metal contacts 90 and metal pads 100 are shown herein in a plane with waveguide 40, and a second of metal contacts 90 and metal pads 100 are shown at an edge of optical element 80 however this is not meant to be limiting in any way. The combination of metal contacts 90 and metal pads 100 may be located to one or both sides of waveguide 40, on a single side of optical element 80, or in any combination of possibilities without exceeding the scope of the invention. Furthermore, only two metal contacts 90 and metal pads 100 are shown, however this is not meant to be limiting in any way. Any number of metal contacts 90 and metal pads 100 as is appropriate for the operation of optical element 80 may be utilized without exceeding the scope of the invention.

Solder balls 110 are illustrated for convenience and ease of illustration. Optionally, as illustrated in FIG. 3c, a conductive adhesive 150 such as silver epoxy may be used in place of solder balls 110 without exceeding the scope of the invention. In the event that a gap exists between metal pads 100 and metal contacts 90, in an exemplary embodiment the gap is filled with an optical adhesive thus supplying a base to support the conductive adhesive across the gap.

FIG. 3c illustrates a side view of PLC based optical component 200 comprising trench 210 exposing waveguide facet 70 and optical element 80 attached according to the principle of the invention utilizing conductive adhesive 150. PLC based optical component 200 comprises: substrate 20; substrate top 30; waveguide 40; trench 50; top surface 60; waveguide facet 70; notch 210; metal pads 100; optical element 80 exhibiting active area 85 and metal contacts 90; and conductive adhesive 150. Waveguide 40 is formed in a layer deposited above substrate top 30. Notch 210 is etched to define facet 70 displaced from trench 50. Trench 50 is cut below the level of waveguide 40, preferably below substrate top 30 into substrate 20 to define a location for optical element 80. Metal pads 100 are deposited onto top surface 60. Optical element 80 is formed with metal contacts 90 preferably configured to appear on either side of optical element 80 as will be explained further hereinto below, and to at least be level with and preferably extend below metal pads 100 when optical element 80 is inserted vertically within trench 50. Conductive adhesive 150 creates a contact between metal contacts 90 and metal pads 100. Conductive adhesive 150 provides both good electrical contact and physical support. In the event that a large gap exists between metal pads 100 and metal contacts 90, in an exemplary embodiment the large gap is filled with optical adhesive thus supplying a base to support conductive adhesive 150 across the large gap.

A unique feature of the invention is that optical element 80 is configured with metal contacts 90 appearing at a location to be in concert with metal pads 100 deposited on top surface 60 when optical element 80 is inserted into trench 50. Optical element 80 is placed vertically within trench 50, with active area 85 positioned opposite facet 70 of waveguide 40. In particular, active area 85 of optical element 80 appears on a facet which is perpendicular to the plane of substrate top 30, and is in direct optical communication with facet 70. It is to be noted that in prior art devices, a mirror or other light bending device is required. Advantageously, no mirror or light bending apparatus is required according to the current invention, and light proceeds in a straight line from facet 70 to active area 85 of optical element 80. In an exemplary embodiment, optical element 80 comprises a photodiode.

Figure 4:
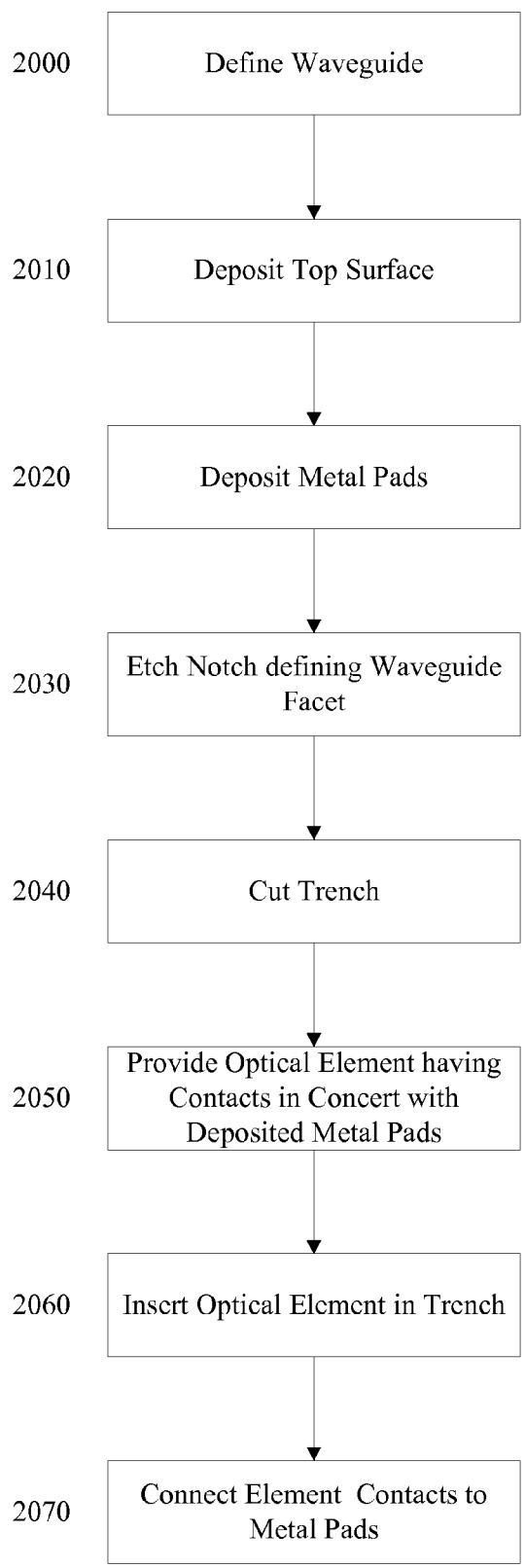
FIG. 4 illustrates stages in the production of the PLC based optical component of FIGS. 3a–3c.

The preparation and production of PLC based optical component 200 of FIGS. 3a–3c is depicted in the flow chart of FIG. 4. In stage 2000 waveguide 40 is defined in layers above substrate top 30. In stage 2010, additional layers are deposited above waveguide 40, burying waveguide 40, and defining top surface 60. In stage 2020, metal pads 100 are deposited on top surface 60 defined in stage 2010.

In stage 2030 notch 210 is etched defining facet 70 of waveguide 40. It is to be understood that stage 2030 may be accomplished either before or after stage 2020, without exceeding the scope of the invention. In stage 2040, trench 50 is cut into PLC based optical component 200 in front of notch 210 etched in stage 2030. Trench 50 is thus cut removed from facet 70 defined in stage 2030. Preferably trench 50 is cut to a depth below the level of substrate top 30. Trench 50 may be cut by sawing, dicing or by other means known to those skilled in the art.

In stage 2050 optical element 80 is provided configured with metal contacts 90 in a position to be soldered to metal pads 100 deposited in stage 2020. In a preferred embodiment metal contacts 90 extend from at least the height of metal pads 100 deposited in stage 2020 and proceed downwards below the level of metal pads 100. The term downwards is used to mean in the direction of the bottom of trench 50 cut in stage 2040. Still further preferably metal contacts 90 further extend above the height of metal pads 100 deposited in stage 2020.

In stage 2060 optical element 80 provided in stage 2050 is placed in trench 50 cut in stage 2040. In an exemplary embodiment active area 85 of optical element 80 is aligned directly opposite waveguide facet 70 defined in stage 2030. In stage 2070 metal contacts 90 of optical element 80 placed in stage 2060 are connected to metal pads 100 deposited in stage 2020. In a preferred embodiment, the stage of connecting is accomplished by depositing solder balls 110 at the nexus, or near nexus, of metal pads 100 and metal contacts 90, and heating solder balls 110. The molten solder wets metal contacts 90 of optical element 80 and metal pads 100 deposited in stage 2020 and flows to make a good solder contact and supply physical support.

In another embodiment, the stage of connecting is accomplished by using conductive adhesive 150 such as silver epoxy at the nexus, or near nexus, of metal pads 100 and metal contacts 90. Conductive adhesive 150 provides both good electrical contact and physical support. In the event that a large gap exists between metal pads 100 and metal contacts 90 in an exemplary embodiment the large gap is filled with optical adhesive thus supplying a base to support the conductive adhesive across the large gap.

FIG. 5 illustrates a top view of a PLC based optical component 300 comprising an optical fiber secured in a v-groove, and having an optical element placed within a trench according to the principle of the current invention. PLC based optical component 300 comprises substrate 20, trench 50, top surface 60, metal pads 100, optical element 80 having active surface 85 and metal contacts 90, solder balls 110, optical fiber 310 having core 320 and v-groove 330. Trench 50 is cut into substrate 20, to define a location for optical element 80. Metal pads 100 are deposited onto top surface 60. Optical element 80 is formed with metal contacts 90 preferably configured to appear on either side of optical element 80 as will be explained further hereinto below, and to at least be level with and preferably extend below metal pads 100 when optical element 80 is inserted vertically within trench 50. Solder balls 110 create a contact between metal contacts 90 and metal pads 100. V-groove 330 is formed to define a location for optical fiber 310, aligning core 320 of optical fiber 310 with active surface 85 of optical element 80.

A unique feature of the invention that optical element 80 is configured to have metal contacts appearing at a location to be in concert with metal pads 100 deposited on top surface 60. Optical element 80 is placed vertically within trench 50, with active surface 85 positioned opposite core 320 of optical fiber 310. In particular, active surface 85 of optical element 80 appears on a facet which is perpendicular to the plane of substrate top 30, and is in direct optical communication with core 320 of optical fiber 310. It is to be noted that in prior art devices, a mirror or other light bending device is required. Advantageously, no mirror or light bending apparatus is required according to the current invention, and light proceeds in a straight optical path from core 320 to active area 85 of optical element 80. In an exemplary embodiment, optical element 80 comprises a photodiode.

The stages in the production of PLC based optical component 300 are similar in all respects to that of the production of PLC based optical component 10 of FIGS. 1a–1c with the exception that waveguide 40 is replaced with optical fiber 310 secured within v-groove 320. The stages of producing a v-groove and a trench, and securing an optical fiber within a v-groove are well known to those skilled in the art.

FIG. 6 illustrates a top view of a PLC based optical component 400 comprising an optical fiber 310 and a focusing lens 420 secured in a silicon optical bench 430 and having an optical element 410 such as a transmitter placed within a trench 50 and attached according to the principle of the invention. PLC based optical component 400 comprises substrate 20, trench 50, top surface 60, metal pads 100, optical element 410 having active area 85 and metal contacts 90, solder balls 110, optical fiber 310 having core 320, v-groove 330, lens 420 and silicon optical bench 430. Trench 50 is cut into substrate 20 defining a location for optical element 410. Optical element 410 is preferably a transmitter, such as a VCSEL or a VECSEL. In a preferred embodiment, lens 420 is a ball lens. Metal pads 100 are deposited onto top surface 60. Optical element 410 is formed with metal contacts 90 preferably configured to appear on either side of optical element 80, and to at least be level with and preferably extend below metal pads 100 when optical element 80 is inserted vertically within trench 50. Solder balls 110 create a contact between metal contacts 90 and metal pads 100. V-groove 330 is formed to define a location for optical fiber 310, optically aligning core 320 of optical fiber 310 through lens 420 with a active area 85 of optical element 410.

A unique feature of the invention is that optical element 410 is configured to have metal contacts appearing at a location to be in concert with metal pads 100 deposited on top surface 60. Optical element 410 is placed vertically within trench 50, with active area 85 positioned opposite lens 420. Lens 420 acts to focus the light to core 320 of optical fiber 310. In particular active area 85 of optical element 410 appears on a facet which is perpendicular to the plane defined by substrate top 30, and is in direct optical communication with core 320 of optical fiber 310. It is to be noted that in prior art devices, a mirror or other light bending device is required. Advantageously, no mirror or light bending apparatus is required according to the current invention, and light proceeds in a straight optical path from facet optical element 410, focused by lens 420 to core 320.

The stages in the production of PLC based optical component 400 are similar in all respects to that of the production of PLC based optical component 10 of FIGS. 1a–1c with the exception that waveguide 40 is replaced with the combination of optical fiber 310 and lens 420 secured within silicon optical bench 430. The stages of producing a silicon optical bench are well known to those skilled in the art.

PLC based optical components 300 and 400 are herein illustrated as using solder balls 110 for connection, however this is not meant to be limiting in any way. Solder balls 110 may be replaced with conductive adhesive 150 without exceeding the scope of the invention.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A planar lightwave circuit having an element secured thereon, the planar lightwave circuit comprising:
   a substrate;
   a trench cut in said substrate;
   at least one metal pad deposited on a top surface above said substrate, said at least one metal pad exhibiting a top surface removed from said substrate top surface;
   at least one of a waveguide defined in a layer deposited above said substrate and below said at least one metal pad and an optical fiber, said top surface of said at least one metal pad being parallel with a longitudinal axis of said at least one of a waveguide and an optical fiber; and
   an optical element placed within said trench and in optical communication with said at least one of a waveguide and an optical fiber,
   said optical element comprising at least one metal contact configured to be adjacent to said metal pad, said metal contact being connected to said metal pad by at least one of a solder ball and a conductive adhesive deposited on the metal pad top surface at a point where said top surface lies parallel with said longitudinal axis of said at least one of a waveguide and an optical fiber,
   wherein said at least one of a solder ball and a conductive adhesive deposited on the metal pad top surface supplies physical support to said optical element and electrical connection between said metal pad and said metal contact.

2. A planar lightwave circuit according to claim 1, wherein said optical element comprises an active optical area on a facet of said optical element substantially perpendicular to said top surface, said optical communication being between said active optical area and said at least one of a waveguide and an optical fiber.

3. A planar lightwave circuit according to claim 1, wherein said optical element is a photodiode.

4. A planar lightwave circuit according to claim 1, wherein said optical element is one of a vertical cavity surface emitting laser and a vertical external cavity surface emitting laser.

5. A planar lightwave circuit according to claim 4, further comprising a lens, said lens being placed between said optical element and said at least one of a waveguide and an optical fiber.

6. A planar lightwave circuit according to claim 5, wherein said lens is a ball lens.

7. A planar lightwave circuit according to claim 1, further comprising a lens, said lens being placed between said optical element and said at least one of a waveguide and an optical fiber.

8. A planar lightwave circuit according to claim 7, wherein said lens is a ball lens.

9. A planar lightwave circuit according to claim 1, wherein said metal pad is connected to said metal contact by said deposited one of a solder ball and a conductive adhesive deposited on the metal pad top surface over a gap.

10. A planar lightwave circuit according to claim 1, wherein said conductive adhesive is silver epoxy.

11. A planar lightwave circuit according to claim 1, wherein said at least one metal pad comprises two metal pads, and wherein said at least one metal contact comprises two metal contacts configured on said optical element to be adjacent said two metal pads, each of said two metal pads being connected to a respective one of said two metal contacts.

12. A planar lightwave circuit according to claim 1, wherein said metal pad is separated from said metal contact by a gap.

13. A planar lightwave circuit according to claim 12, wherein said gap is filled with optical adhesive, said optical adhesive supporting said at least one of a solder ball and a conductive adhesive.

14. An optical element for use in a planar lightwave circuit having a substrate, the optical element comprising:
   a first facet having an optical aperture, said first facet exhibiting an end configured and dimensioned to placed at the bottom of a trench formed in a planar lightwave circuit; and
   a plurality of contacts positioned to extend above a top surface of matching pads deposited on, and parallel to, a top surface of the planar lightwave circuit, said top surface of the matching pads opposing a bottom surface of the matching pads, the bottom surface being formed on the top surface of the planar lightwave circuit, said plurality of contacts being positioned removed from said end of said first facet.

15. An optical element according to claim 14, wherein at least one of said plurality of contacts is placed on said first facet.

16. An optical element according to claim 14, wherein said contacts are dimensioned to further extend below said top surface.

17. An optical element according to claim 14, further comprising a facet opposing said first facet, wherein at least one of said plurality of contacts is placed on said facet opposing said first facet.

18. An optical element according to claim 14, wherein said optical element is one of a photodiode, a vertical cavity surface emitting laser and a vertical external cavity surface emitting laser.

19. A method of manufacturing a planar lightwave circuit, comprising:
 defining a waveguide;
 defining a top surface above said waveguide;
 depositing at least one metal pad on said top surface, said at least one metal pad exhibiting a top surface removed from said defined top surface above said waveguide and parallel to a longitudinal axis of said defined waveguide;
 providing an optical element having at least one metal contact configured to extend above said top surface of said deposited metal pad;
 cutting a trench;
 defining a facet of said waveguide;
 inserting said provided optical element within said cut trench; and
 connecting said at least one metal contact to said top surface of said at least one deposited metal pad at a point where said top surface lies parallel with said longitudinal axis of said waveguide.

20. A method of manufacturing a planar lightwave circuit according to claim 19, wherein said provided optical element comprises an active optical area, said stage of inserting being accomplished with said active optical area being substantially perpendicular to said waveguide.

21. A method of manufacturing a planar lightwave circuit according to claim 19, wherein said provided optical element is one of a photodiode, a vertical cavity surface emitting laser and a vertical external cavity surface emitting laser.

22. A method of manufacturing a planar lightwave circuit according to claim 19, wherein said connecting comprises placing a solder ball and heating said placed solder ball.

23. A method of manufacturing a planar lightwave circuit according to claim 19, wherein said connecting comprises placing conductive adhesive.

24. A method of manufacturing a planar lightwave circuit according to claim 19, wherein said connecting further comprises filling a gap between said metal contacts and said top surface of said at least one deposited metal pad with optical adhesive.

25. A method of manufacturing a planar lightwave circuit according to claim 24, wherein said connecting comprises placing conductive adhesive on top of said optical adhesive, said optical adhesive supporting said conductive adhesive.

26. A method of manufacturing a planar lightwave circuit according to claim 19, wherein said connecting provides physical support to said optical element and electrical connection between said top surface of said deposited at least one metal pad and said metal contact.

27. A method of manufacturing a planar lightwave circuit, comprising:
 providing a substrate;
 defining a v-groove in a first portion of said substrate;
 defining a top surface deposited on a second portion of said substrate;
 depositing at least one metal pad on said top surface, said at least one metal pad exhibiting a top surface parallel to, and removed from, said defined top surface on said second portion of said substrate;
 providing an optical element having at least one metal contact configured to be adjacent to, and extend above, said top surface of said deposited metal pad;
 cutting a trench;
 placing an optical fiber in said v-groove;
 inserting said provided optical element within said cut trench; and
 connecting said at least one metal contact to said top surface of said at least one deposited metal pad at a point where said top surface of said at least one metal pad lies parallel with a longitudinal axis of said placed optical fiber.

28. A method of manufacturing a planar lightwave circuit according to claim 27, wherein said provided optical element comprises an active optical area, said inserting being accomplished with said active optical area being substantially perpendicular to placed optical fiber.

29. A method of manufacturing a planar lightwave circuit according to claim 27, wherein said provided optical element is one of a photodiode, a vertical cavity surface emitting laser and a vertical external cavity surface emitting laser.

30. A method of manufacturing a planar lightwave circuit according to claim 27, wherein said connecting comprises placing a solder ball and heating said placed solder ball.

31. A method of manufacturing a planar lightwave circuit according to claim 27, wherein said connecting comprises placing conductive adhesive.

32. A method of manufacturing a planar lightwave circuit according to claim 27, wherein said connecting further comprises filling a gap between said metal contacts and said top surface of said deposited at least one metal pad with optical adhesive.

33. A method of manufacturing a planar lightwave circuit according to claim 32, wherein said connecting comprises placing conductive adhesive on top of said optical adhesive, said optical adhesive supporting said conductive adhesive.

34. A method of manufacturing a planar lightwave circuit according to claim 27, wherein said connecting provides physical support to said optical element and electrical connection between said top surface of said deposited metal pad and said metal contact.

\* \* \* \* \*